(12) United States Patent
Clark et al.

(10) Patent No.: US 8,205,024 B2
(45) Date of Patent: Jun. 19, 2012

(54) PROTECTING OWNERSHIP TRANSFER WITH NON-UNIFORM PROTECTION WINDOWS

(75) Inventors: Leo J. Clark, Georgetown, TX (US);
James S. Fields, Jr., Austin, TX (US);
Guy L. Guthrie, Austin, TX (US);
William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1616 days.

(21) Appl. No.: 11/560,619

(22) Filed: Nov. 16, 2006

(65) Prior Publication Data

US 2008/0120625 A1 May 22, 2008

(51) Int. Cl.
*G06F 3/00* (2006.01)
*G06F 13/00* (2006.01)

(52) U.S. Cl. ........... 710/45; 710/124; 711/141; 711/146
(58) Field of Classification Search .................... 710/22, 710/25, 27, 28, 45, 100, 105, 124, 200, 240, 710/305, 308; 711/100, 141, 146, 152, 154, 711/163
See application file for complete search history.

(56) References Cited

U.S. PATENT DOCUMENTS

| | | | | |
|---|---|---|---|---|
| 5,446,863 | A * | 8/1995 | Stevens et al. | 711/100 |
| 5,608,878 | A * | 3/1997 | Arimilli et al. | 710/107 |
| 5,790,892 | A * | 8/1998 | Kaiser et al. | 710/48 |
| 6,266,741 | B1 * | 7/2001 | Hui et al. | 711/122 |
| 2002/0129211 | A1 * | 9/2002 | Arimilli et al. | 711/146 |
| 2003/0005236 | A1 | 1/2003 | Arimilli et al. | |
| 2003/0009643 | A1 | 1/2003 | Arimilli et al. | |
| 2003/0014593 | A1 | 1/2003 | Arimilli et al. | |
| 2004/0068595 | A1 * | 4/2004 | Dieffenderfer et al. | 710/105 |
| 2004/0111576 | A1 | 6/2004 | Arimilli et al. | |
| 2004/0268059 | A1 | 12/2004 | Landin et al. | |
| 2006/0179197 | A1 * | 8/2006 | Chung et al. | 710/242 |
| 2006/0179252 | A1 | 8/2006 | Cantin et al. | |
| 2006/0179253 | A1 | 8/2006 | Fields, Jr. et al. | |

OTHER PUBLICATIONS

Fields et al..; "Data Processing System, Method and Interconnect Fabric That Protect Ownership Trasfer With Non-Uniform Protection Windows" 47 Pages; to be filed concurrently.

* cited by examiner

*Primary Examiner* — Khanh Dang
(74) *Attorney, Agent, or Firm* — Yudell Isidore Ng Russell PLLC

(57) ABSTRACT

In a data processing system, a plurality of agents communicate operations therebetween. Each operation includes a request and a combined response representing a system-wide response to the request. Latencies of requests and combined responses between the plurality of agents are observed. Each of the plurality of agents is configured with a respective duration of a protection window extension by reference to the observed latencies. Each protection window extension is a period following receipt of a combined response during winch an associated one of the plurality of agents protects transfer of coherency ownership of a data granule between agents. The plurality of agents employing protection window extensions in accordance with the configuration, and at least two of the agents have protection window extensions of differing durations.

13 Claims, 15 Drawing Sheets

PROTECTING OWNERSHIP TRANSFER WITH NON-UNIFORM PROTECTION WINDOWS

CROSS-REFERENCE TO RELATED APPLICATION(S)

The present application is related to the following U.S. Patent Application(s), which are assigned to the assignee hereof and incorporated herein by reference in their entireties:

U.S. patent application No. 11/560,603, filed concurrently herewith, now U.S. Pat. No. 7,734,876;

U.S. patent application No. 11/055,305, now U.S. Patent No. 7,389,388; and U.S. patent application No. 11/054,841, now abandoned.

BACKGROUND OF THE INVENTION

1. Technical Field

The present invention relates in general to data processing systems and, in particular, to improved communication in a data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

As the clock frequencies at which processing units are capable of operating have risen and system scales have increased, the latency of communication between processing units via the system interconnect has become a critical performance concern. To address this performance concern, various interconnect designs have been proposed and/or implemented that are intended to improve performance and scalability over conventional bused interconnects.

SUMMARY OF THE INVENTION

In a data processing system, a plurality of agents communicate operations therebetween. Each operation includes a request and a combined response representing a system-wide response to the request. Latencies of requests and combined responses between the plurality of agents are observed. Each of the plurality of agents is configured with a respective duration of a protection window extension by reference to the observed latencies. Each protection window extension is a period following receipt of a combined response during which an associated one of the plurality of agents protects transfer of coherency ownership of a data granule between agents. The plurality of agents employing protection window extensions in accordance with the configuration, and at least two of the agents have protection window extensions of differing durations.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

I. Processing Unit and Data Processing System

Figure 1:
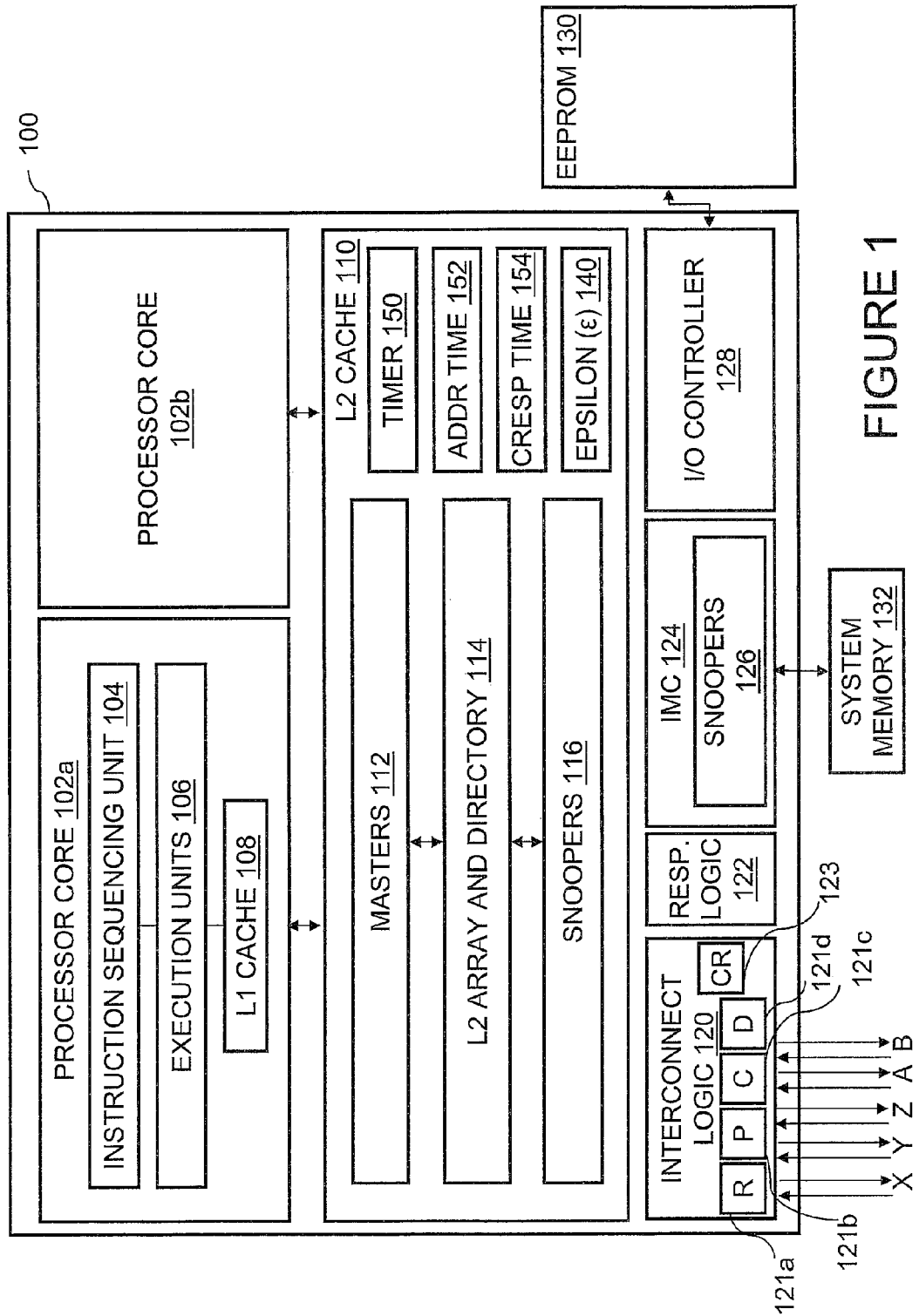
FIG. 1 is a high level block diagram of an exemplary processing unit in accordance with the present invention.

With reference now to the figures and, in particular, with reference to FIG. 1, there is illustrated a high level block diagram of an exemplary embodiment of a processing unit 100 in accordance with the present invention. In the depicted embodiment, processing unit 100 is a single integrated circuit including two processor cores 102a, 102b for independently processing instructions and data. Each processor core 102 includes at least an instruction sequencing unit (ISU) 104 for fetching and ordering instructions for execution and one or more execution units 106 for executing instructions. The instructions executed by execution units 106 may include, for example, fixed and floating point arithmetic instructions, logical instructions, and instructions that request read and write access to a memory block.

The operation of each processor core 102a, 102b is supported by a multi-level volatile memory hierarchy having at its lowest level one or more shared system memories 132 (only one of which is shown in FIG. 1) and, at its upper levels, one or more levels of cache memory. As depicted, processing unit 100 includes an integrated memory controller (IMC) 124 that controls read and write access to a system memory 132 in response to requests received from processor cores 102a, 102b and operations snooped on an interconnect fabric (described below) by snoopers 126.

In the illustrative embodiment, the cache memory hierarchy of processing unit 100 includes a store-through level one (L1) cache 108 within each processor core 102a, 102b and a level two (L2) cache 110 shared by all processor cores 102a, 102b of the processing unit 100. L2 cache 110 includes an L2 array and directory 114, masters 112 and snoopers 116. Masters 112 initiate transactions on the interconnect fabric and access L2 array and directory 114 in response to memory access (and other) requests received from the associated processor cores 102a, 102b. Snoopers 116 detect operations on the interconnect fabric, provide appropriate responses, and perform any accesses to L2 array and directory 114 required by the operations. Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

As further shown in FIG. 1, processing unit 100 includes integrated interconnect logic 120 by which processing unit 100 may be coupled to the interconnect fabric as part of a larger data processing system. In the depicted embodiment, interconnect logic 120 supports an arbitrary number t1 of "first tier" interconnect links, which in this case include in-bound and out-bound X, Y and Z links. Interconnect logic 120 further supports an arbitrary number t2 of second tier links, designated in FIG. 1 as in-bound and out-bound A and B links. With these first and second tier links, each processing unit 100 may be coupled for bi-directional communication to up to t1/2+t2/2 (in this case, five) other processing units 100. Interconnect logic 120 includes request logic 121a, partial response logic 121b, combined response logic 121c and data logic 121d for processing and forwarding information during different phases of operations. In addition, interconnect logic 120 includes a configuration register 123 including a plurality of mode bits utilized to configure processing unit 100.

Each processing unit 100 further includes an instance of response logic 122, which implements a portion of a distributed coherency signaling mechanism that maintains cache coherency between the cache hierarchy of processing unit 100 and those of other processing units 100. Finally, each processing unit 100 includes an integrated I/O (input/output) controller 128 supporting the attachment of one or more I/O devices, such as Electrically Erasable Programmable Read Only Memory (EEPROM) 130. I/O controller 128 may issue operations and receive data on the X, Y, Z, A and B links.

According to the depicted embodiment of the present invention, processing unit 100 also includes facilities utilized to optimize communication within a data processing system including multiple processing units 100, such as that discussed below with reference to FIG. 1. Such facilities include at least an epsilon register 140, and in a second embodiment of the present invention described below with reference to FIGS. 8A-8E, further include a timer 150, address timestamp register 152, and combined response (Cresp) timestamp register 154.

Figure 2:
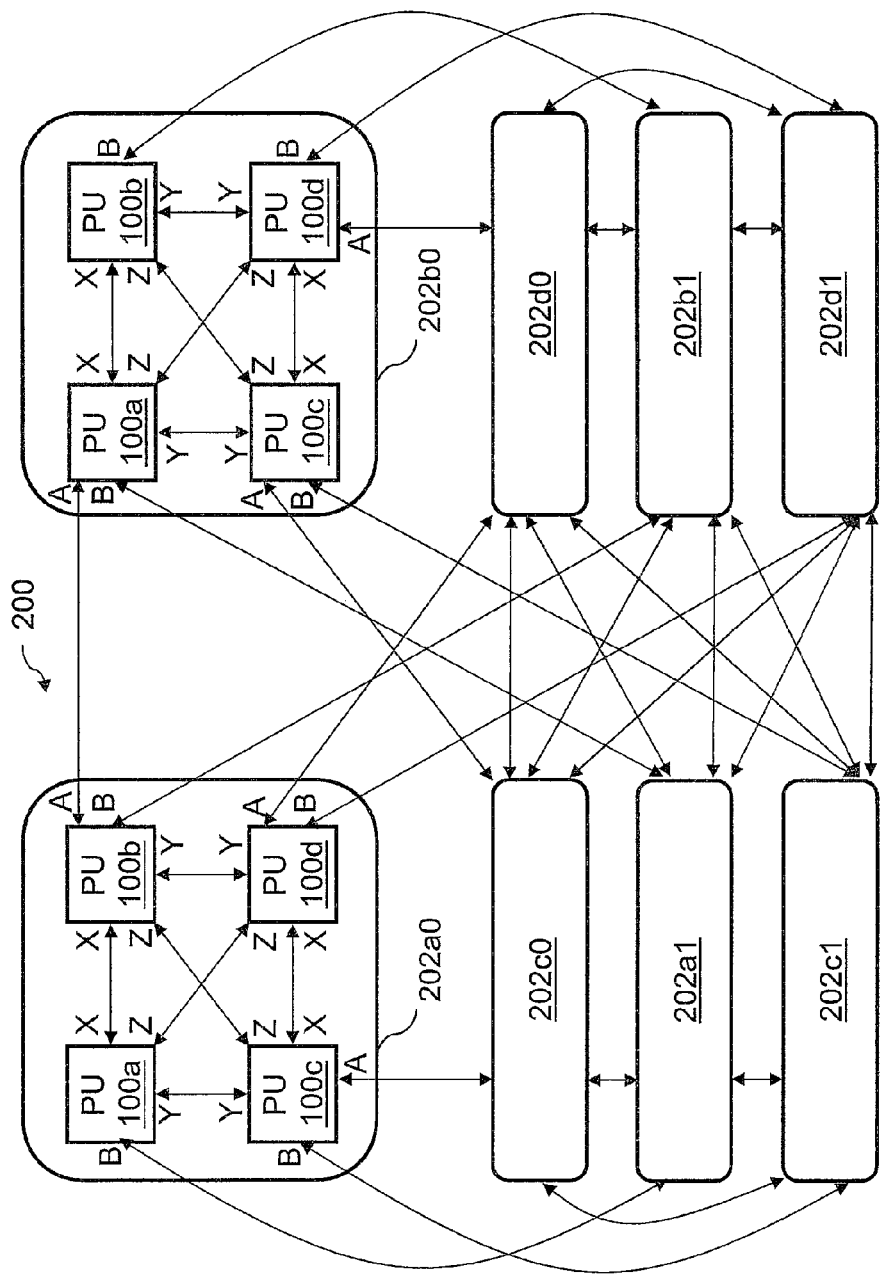
FIG. 2 is a high level block diagram of an exemplary data processing system in accordance with the present invention.

Referring now to FIG. 2, there is depicted a block diagram of an exemplary embodiment of a data processing system 200 formed of multiple processing units 100 in accordance with the present invention. As shown, data processing system 200 includes eight processing nodes 202a0-202d0 and 202a1-202d1, which in the depicted embodiment, are each realized as a multi-chip module (MCM) comprising a package containing four processing units 100. The processing units 100 within each processing node 202 are coupled for point-to-point communication by the processing units' X, Y, and Z links, as shown. Each processing unit 100 may be further coupled to processing units 100 in two different processing nodes 202 for point-to-point communication by the processing units' A and B links. Although illustrated in FIG. 2 with a double-headed arrow, it should be understood that each pair of X, Y, Z, A and B links are preferably (but not necessarily) implemented as two uni-directional links, rather than as a bi-directional link.

General expressions for forming the topology shown in FIG. 2 can be given as follows:

---

Node[ I ][ K ].chip[ J ].link[ K ] connects to
Node[ J ][ K ].chip[ I ].link[ K ], for all I ≠ J; and
Node[ I ][ K ].chip[ I ].link[ K ] connects to
Node[ I ][ not K ].chip[ I ].link[ not K ]; and
Node[ I ][ K ].chip[ I ].link[ not K ] connects either to:
   (1) Nothing in reserved for future expansion; or
   (2) Node[ extra ][ not K ].chip[ I ].link[ K ], in case in which all links are fully utilized (i.e., nine 8-way nodes forming a 72-way system); and where I and J belong to the set {a, b, c, d} and K belongs to the set {A,B}.

---

Of course, alternative expressions can be defined to form other functionally equivalent topologies. Moreover, it should be appreciated that the depicted topology is representative but not exhaustive of data processing system topologies embodying the present invention and that other topologies are possible. In such alternative topologies, for example, the number of first tier and second tier links coupled to each processing unit 100 can be an arbitrary number, and the number of processing nodes 202 within each tier (i.e., I) need not equal the number of processing units 100 per processing node 100 (i.e., J). Moreover, in some implementations, the topology may not be fully populated in that some of processing nodes 202 or individual processing units 100 may be absent, disabled (e.g., for power management or workload reasons), or otherwise non-functional (e.g., due to a hardware error).

Even though fully connected in the manner shown in FIG. 2, all processing nodes 202 need not communicate each operation to all other processing nodes 202. In particular, as noted above, processing units 100 may broadcast operations with a scope limited to their processing node 202 or with a larger scope, such as a system-wide scope including all processing nodes 202.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 2 or discussed further herein.

II. Exemplary Operation

Figure 3:
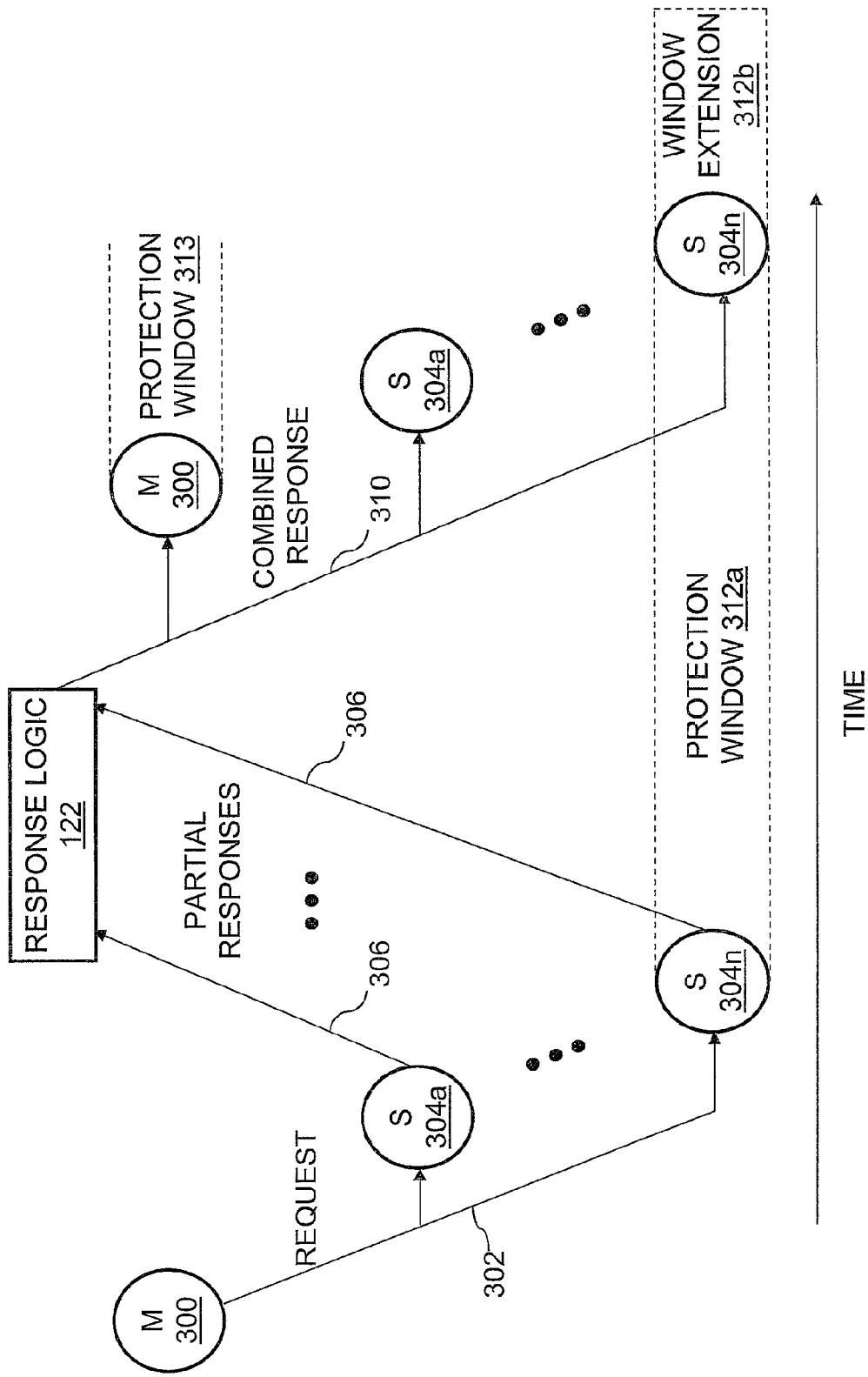
FIG. 3 is a time-space diagram of an exemplary operation including a request phase, a partial response phase and a combined response phase.

Referring now to FIG. 3, there is depicted a time-space diagram of an exemplary operation on the interconnect fabric of data processing system 200 of FIG. 2. The operation begins when a master 300 (e.g., a master 112 of an L2 cache 110 or a master within an I/O controller 128) issues a request 302 on the interconnect fabric. Request 302 preferably includes at least a transaction type indicating a type of desired access and a resource identifier (e.g., real address) indicating a resource to be accessed by the request. Common types of requests preferably include those set forth below in Table I.

TABLE I

| Request | Description |
|---|---|
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Further details regarding these operations and an exemplary cache coherency protocol that facilitates efficient handling of these operations may be found in the copending U.S. patent application Ser. No. 11/055,305 incorporated by reference above.

Request 302 is received by snoopers 304, for example, snoopers 116 of L2 caches 110 and snoopers 126 of IMCs 124, distributed throughout data processing system 200. In general, with some exceptions, snoopers 116 in the same L2 cache 110 as the master 112 of request 302 do not snoop request 302 (i.e., there is generally no self-snooping) because a request 302 is transmitted on the interconnect fabric only if the request 302 cannot be serviced internally by a processing unit 100. Snoopers 304 that receive and process requests 302 each provide a respective partial response 306 representing the response of at least that snooper 304 to request 302. A snooper 126 within an IMC 124 determines the partial response 306 to provide based, for example, upon whether the snooper 126 is responsible for the request address and whether it has resources available to service the request. A snooper 116 of an L2 cache 110 may determine its partial response 306 based on, for example, the availability of its L2 cache directory 114, the availability of a snoop logic instance within snooper 116 to handle the request, and the coherency state associated with the request address in L2 cache directory 114.

The partial responses 306 of snoopers 304 are logically combined either in stages or all at once by one or more instances of response logic 122 to determine a combined response (CR) 310 to request 302. In one preferred embodiment, which will be assumed hereinafter, the instance of response logic 122 responsible for generating combined response 310 is located in the processing unit 100 containing the master 300 that issued request 302. Response logic 122 provides combined response 310 to master 300 and snoopers 304 via the interconnect fabric to indicate the response (e.g., success, failure, retry, etc.) to request 302. If the CR 310 indicates success of request 302, CR 310 may indicate, for example, a data source for a requested memory block, a cache state in which the requested memory block is to be cached by master 300, and whether "cleanup" operations invalidating the requested memory block in one or more L2 caches 110 are required.

In response to receipt of combined response 310, one or more of master 300 and snoopers 304 typically perform one or more operations in order to service request 302. These operations may include supplying data to master 300, invalidating or otherwise updating the coherency state of data cached in one or more L2 caches 110, performing castout operations, writing back data to a system memory 132, etc. If required by request 302, a requested or target memory block maybe transmitted to or from master 300 before or after the generation of combined response 310 by response logic 122.

In the following description, the partial response 306 of a snooper 304 to a request 302 and the operations performed by the snooper 304 in response to the request 302 and/or its combined response 310 will be described with reference to whether that snooper is a Highest Point of Coherency (HPC), a Lowest Point of Coherency (LPC), or neither with respect to tie request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 124 for the system memory 132 holding the referenced memory block. An LPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 110. Although other indicators may be utilized to designate an HPC for a memory block, a preferred embodiment of the present invention designates the HPC, if any, for a memory block utilizing selected cache coherency state(s) within the L2 cache directory 114 of an L2 cache 110.

Still referring to FIG. 3, the HPC, if any, for a memory block referenced in a request 302, or in the absence of an HPC, the LPC of the memory block, preferably has the responsibility of protecting the transfer of ownership of a memory block, if necessary, in response to a request 302. In the exemplary scenario shown in FIG. 3, a snooper 304n at the HPC (or in the absence of an HPC, the LPC) for the memory block specified by the request address of request 302 protects the transfer of ownership of the requested memory block to master 300 during a protection window 312a that extends from the time that snooper 304n determines its partial response 306 until snooper 304n receives combined response 310 and during a subsequent window extension 312b extending a programmable time beyond receipt by snooper 304n of combined response 310. During protection window 312a and window extension 312b, snooper 304n protects the transfer of ownership by providing partial responses 306 to other requests specifying the same request address that prevent other masters from obtaining ownership (e.g., a retry partial response) until ownership has been successfully transferred to master 300. Master 300 likewise initiates a protection window 313 to protect its ownership of the memory block requested in request 302 following receipt of combined response 310.

Because snoopers 304 all have limited resources for handling the CPU and I/O requests described above, several different levels of partial responses and corresponding CRs are possible. For example, if a snooper 126 within a memory controller 124 that is responsible for a requested memory block has a queue available to handle a request, the snooper 126 may respond with a partial response indicating that it is able to serve as the LPC for the request. If, on the other hand, the snooper 126 has no queue available to handle the request, the snooper 126 may respond with a partial response indicating that is the LPC for the memory block, but is unable to currently service the request. Similarly, a snooper 116 in an L2 cache 110 may require an available instance of snoop logic and access to L2 cache directory 114 in order to handle a request. Absence of access to either (or both) of these resources results in a partial response (and corresponding CR) signaling an inability to service the request due to absence of a required resource.

III. Broadcast Flow of Exemplary Operations

Figure 4:
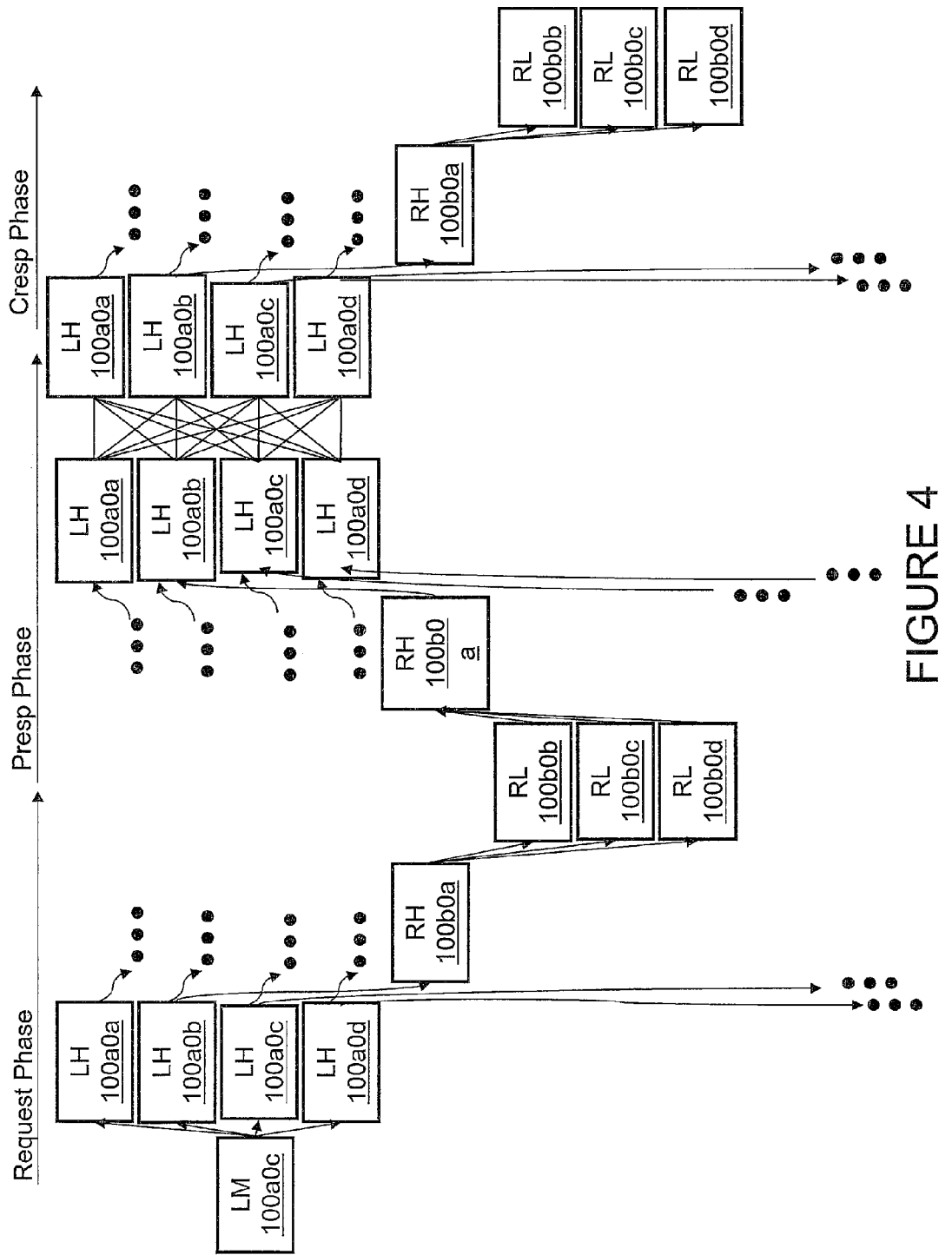
FIG. 4 is a time-space diagram of an exemplary operation of system-wide scope within the data processing system of FIG. 2.

Referring now to FIG. 4, which will be described in conjunction with FIGS. 5A-5C, there is illustrated a time-space diagram of an exemplary operation flow of an operation of system-wide scope in data processing system 200 of FIG. 2. In these figures, the various processing units 100 within data processing system 200 are tagged with two locational identifiers—a first identifying the processing node 202 to which the processing unit 100 belongs and a second identifying the particular processing unit 100 within the processing node 202. Thus, for example, processing unit 100a0c refers to processing unit 100c of processing node 202a0. In addition, each processing unit 100 is tagged with a functional identifier indicating its function relative to the other processing units 100 participating in the operation. These functional identifiers include: (1) local master (LM), which designates the processing unit 100 that originates the operation, (2) local hub (LH), which designates a processing unit 100 that is in the same processing node 202 as the local master and that is responsible for transmitting the operation to another processing node 202 (a local master can also be a local hub), (3) remote hub (RH), which designates a processing unit 100 that is in a different processing node 202 than the local master and that is responsible to distribute the operation to other processing units 100 in its processing node 202, and (4) remote leaf (RL), which designates a processing unit 100 that is in a different processing node 202 from the local master and that is not a remote hub.

As shown in FIG. 4, the exemplary operation has at least three phases as described above with reference to FIG. 3, namely, a request (or address) phase, a partial response (Presp) phase, and a combined response (Cresp) phase. These three phases preferably occur in the foregoing order and do not overlap. The operation may additionally have a data phase, which may optionally overlap with any of the request, partial response and combined response phases.

Figure 5A:
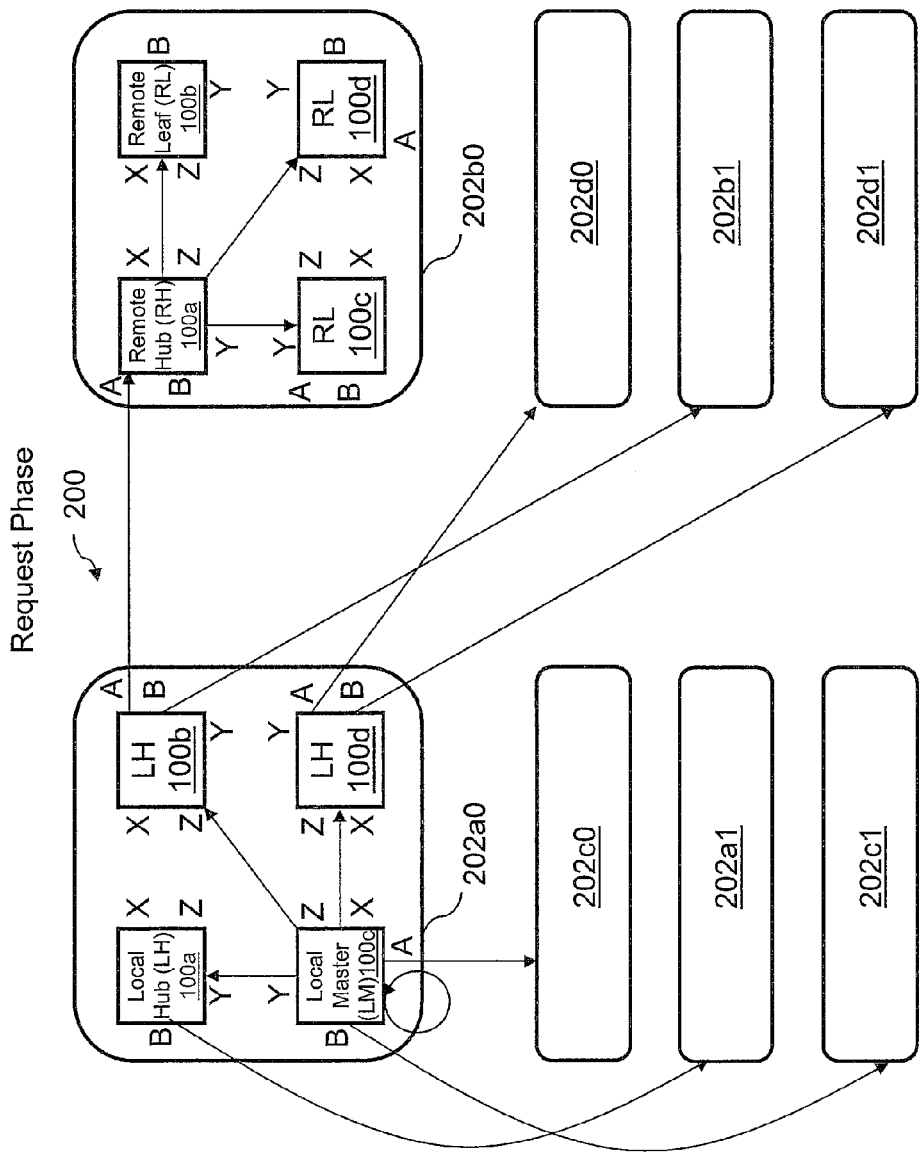
FIGS. 5A-5C depict the information flow of the exemplary system-wide broadcast operation depicted in FIG. 4.

Still referring to FIG. 4 and referring additionally to FIG. 5A, the request phase begins when a local master 100a0c (i.e., processing unit 100c of processing node 202a0) performs a synchronized broadcast of a request, for example, a read request, to each of the local hubs 100a0a, 100a0b, 100a0c and 100a0d within its processing node 202a0. It should be noted that the list of local hubs includes local hub 100a0c, which is also the local master. As described further below, this internal transmission is advantageously employed to synchronize the operation of local hub 100a0c with local hubs 100a0a, 100a0b and 100a0d so that the timing constraints discussed below can be more easily satisfied.

In response to receiving the request, each local hub 100 that is coupled to a remote hub 100 by its A or B links transmits the operation to its remote hub(s) 100. Thus, local hub 100a0a makes no transmission of the operation on its outbound A link, but transmits the operation via its outbound B link to a remote hub within processing node 202a1. Local hubs 100a0b, 100a0c and 100a0d transmit the operation via their respective outbound A and B links to remote hubs in processing nodes 202b0 and 202b1, processing nodes 202c0 and 202c1, and processing nodes 202d0 and 202d1, respectively. Each remote hub 100 receiving the operation in turn transmits the operation to each remote leaf 100 in its processing node 202. Thus, for example, local hub 100b0a transmits the operation to remote leaves 100b0b, 100b0c and 100b0d. In this manner, the operation is efficiently broadcast to all processing units 100 within data processing system 200 utilizing transmission over no more than three links.

Figure 5B:
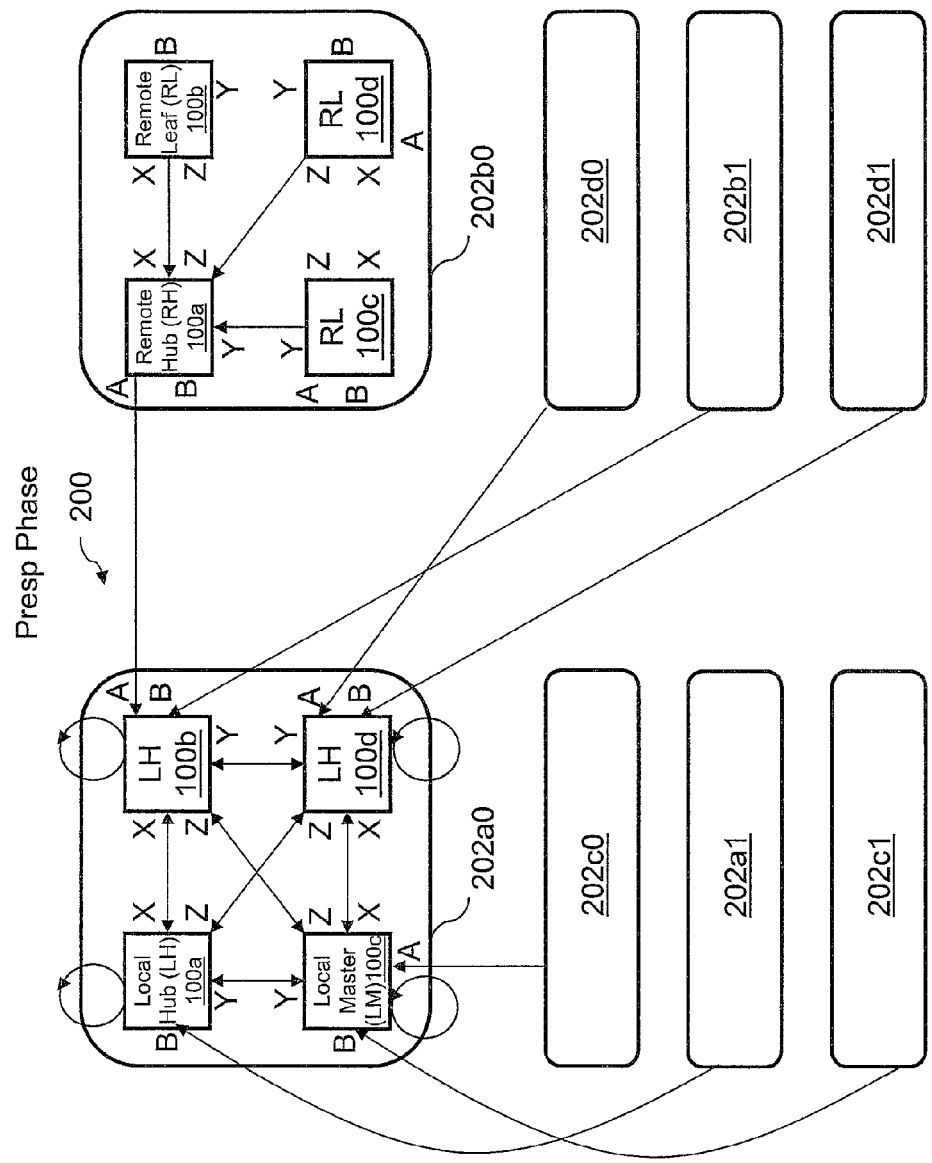

Following the request phase, the partial response (Presp) phase occurs, as shown in FIGS. 4 and 5B. In the partial response phase, each remote leaf 100 evaluates the operation and provides its partial response to the operation to its respective remote hub 100. For example, remote leaves 100b0b, 100b0c and 100b0d transmit their respective partial responses to remote hub 100b0a. Each remote hub 100 in turn transmits these partial responses, as well as its own partial response, to a respective one of local hubs 100a0a, 100a0b, 100a0c and 100a0d. Local hubs 100a0a, 100a0b, 100a0c and 100a0d then broadcast these partial responses, as well as their own partial responses, to each local hub 100 in processing node 202a0. It should be noted by reference to FIG. 5B that the broadcast of partial responses by the local hubs 100 within processing node 202a0 includes, for timing reasons, the self-broadcast by each local hub 100 of its own partial response.

As will be appreciated, the collection of partial responses in the manner shown can be implemented in a number of different ways. For example, it is possible to communicate an individual partial response back to each local hub from each other local hub, remote hub and remote leaf. Alternatively, for greater efficiency, it may be desirable to accumulate partial responses as they are communicated back to the local hubs. In order to ensure that the effect of each partial response is accurately communicated back to local hubs 100, it is preferred that the partial responses be accumulated, if at all, in a non-destructive manner, for example, utilizing a logical OR function and an encoding in which no relevant information is lost when subjected to such a function (e.g., a "one-hot" encoding).

Figure 5C:
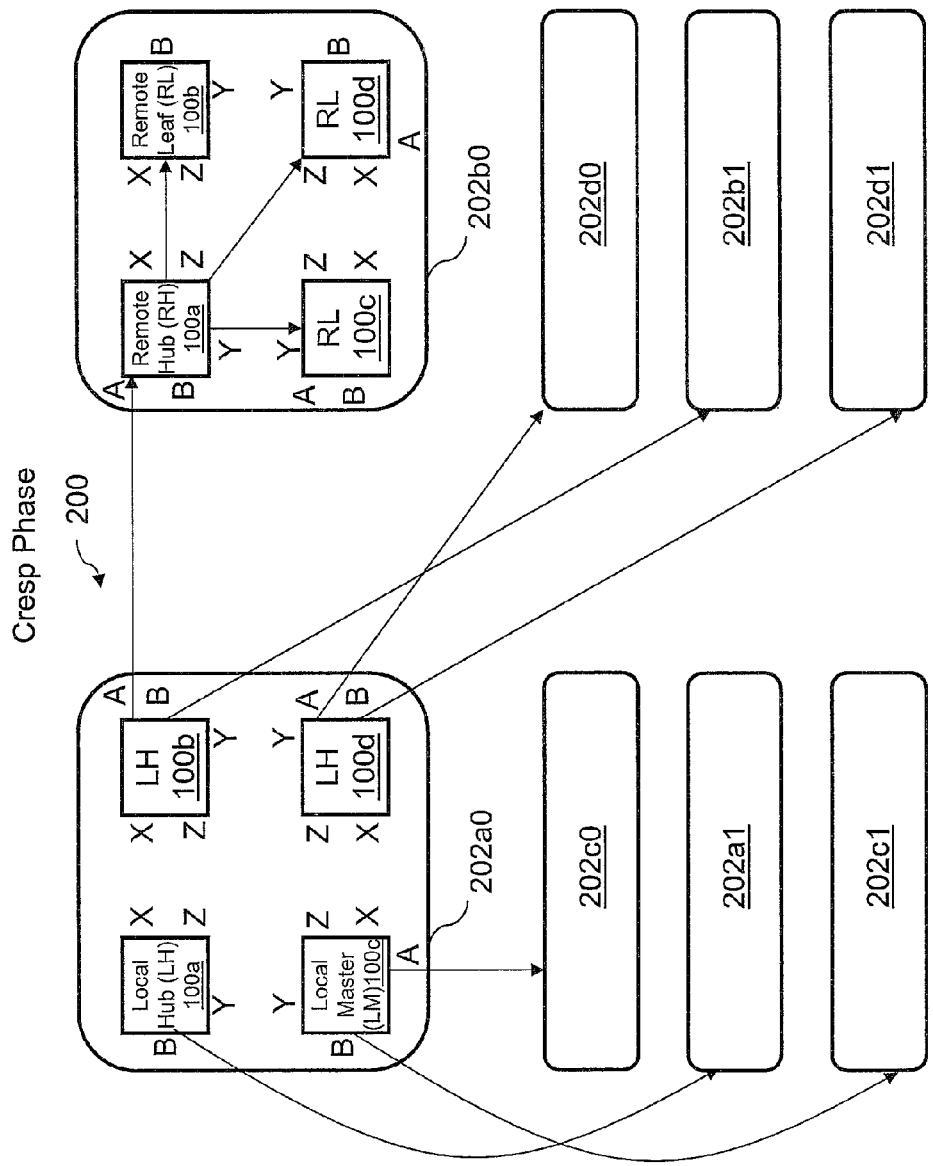

As further shown in FIG. 4 and FIG. 5C, response logic 122 at each local hub 100 within processing node 202a0 compiles the partial responses of the other processing units 100 to obtain a combined response representing the system-wide response to the request. Local hubs 100a0a-100a0d then broadcast the combined response to all processing units 100 following the same paths of distribution as employed for the request phase. Thus, the combined response is first broadcast to remote hubs 100, which in turn transmit the combined response to each remote leaf 100 within their respective processing nodes 202. For example, remote hub 100a0b transmits the combined response to remote hub 100b0a, which in turn transmits the combined response to remote leaves 100b0b, 100b0c and 100b0d.

Figure 5D:
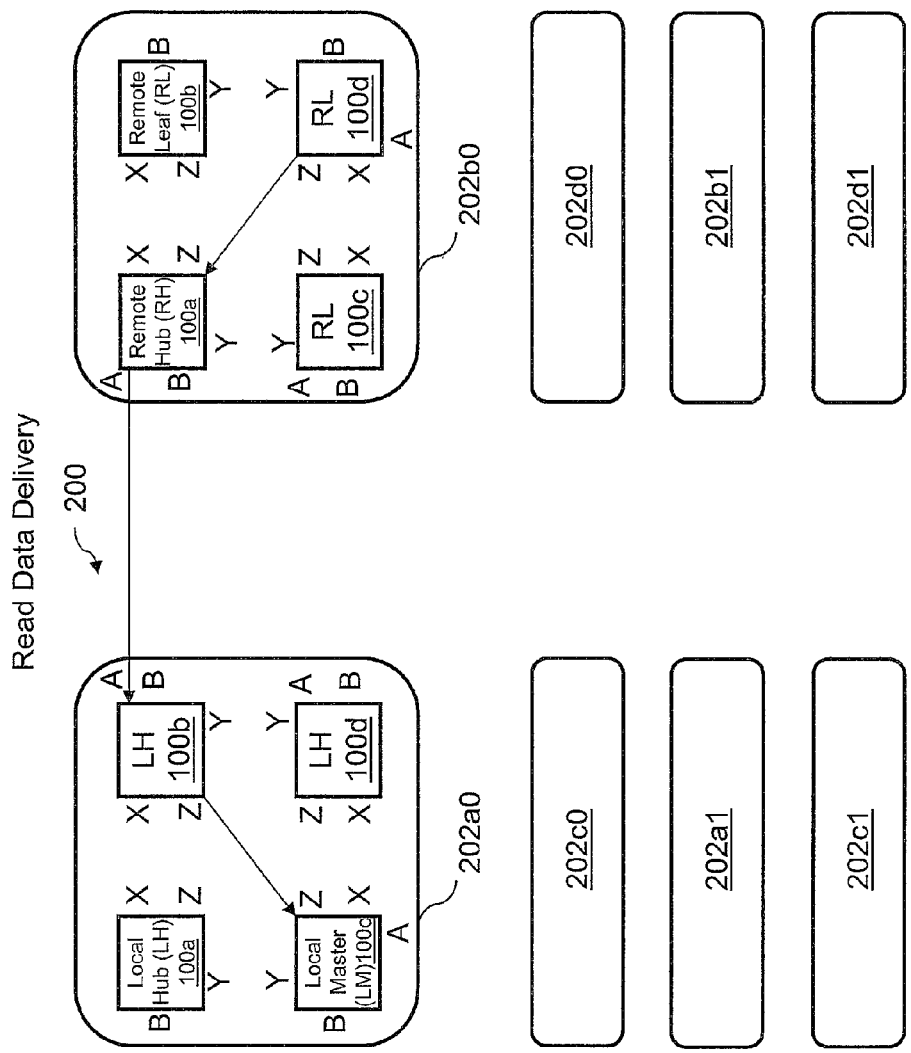
FIGS. 5D-5E depict an exemplary data flow for an exemplary system-wide broadcast operation in accordance with the present invention.
Figure 5E:
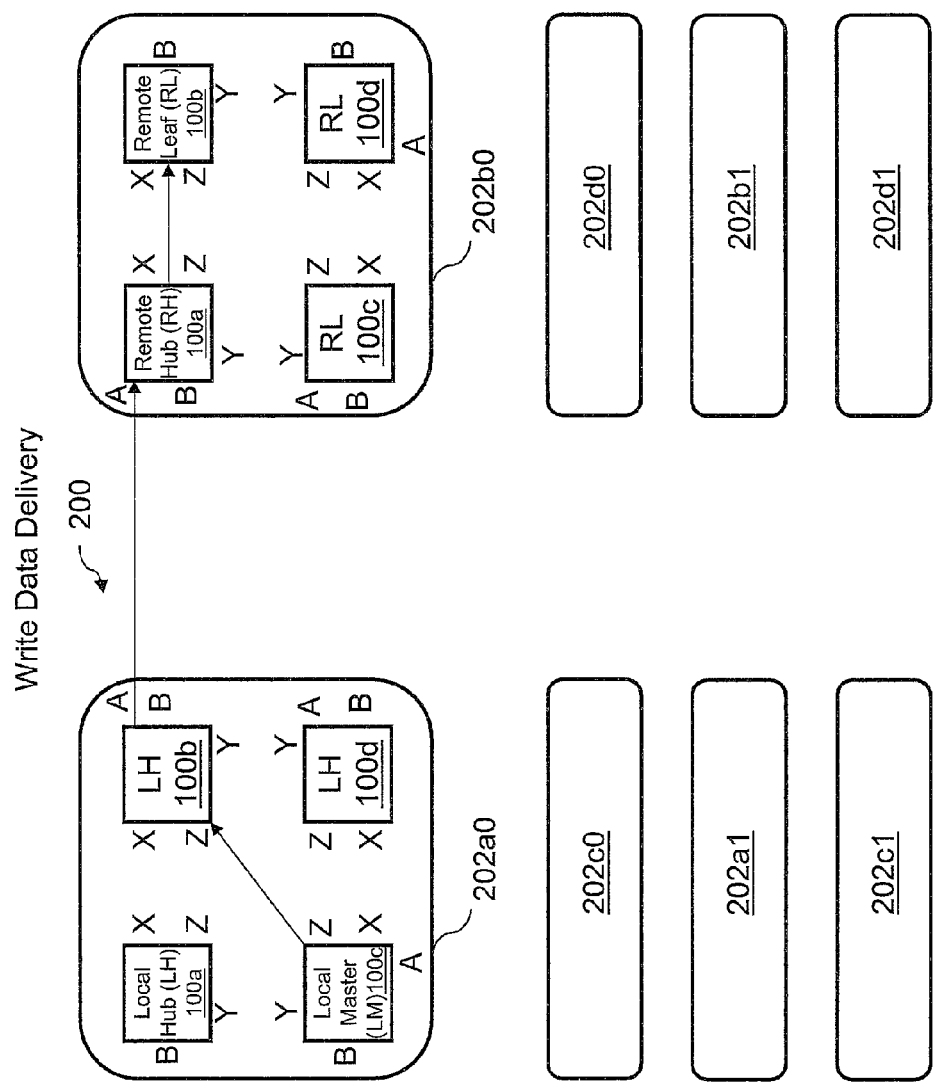

As noted above, servicing the operation may require an additional data phase, such as shown in FIGS. 5D or 5E. For example, as shown in FIG. 5D, if the operation is a read-type operation, such as a read or RWITM operation, remote leaf 100b0d may source the requested memory block to local master 100a0c via the links connecting remote leaf 100b0d to remote hub 100b0a, remote hub 100b0a to local hub 100a0b, and local hub 100a0b to local master 100a0c. Conversely, if the operation is a write-type operation, for example, a cache castout operation writing a modified memory block back to the system memory 132 of remote leaf 100b0b, the memory block is transmitted via the links connecting local master 100a0c to local hub 100a0b, local hub 100a0b to remote hub 100b0a, and remote hub 100b0a to remote leaf 100b0b, as shown in FIG. 5E.

Of course, the operation depicted in FIG. 4 and FIGS. 5A-5E is merely exemplary of the myriad of possible system-wide operations that may occur concurrently in a multiprocessor data processing system such as data processing system 200.

IV. Timing Considerations

Figure 6:
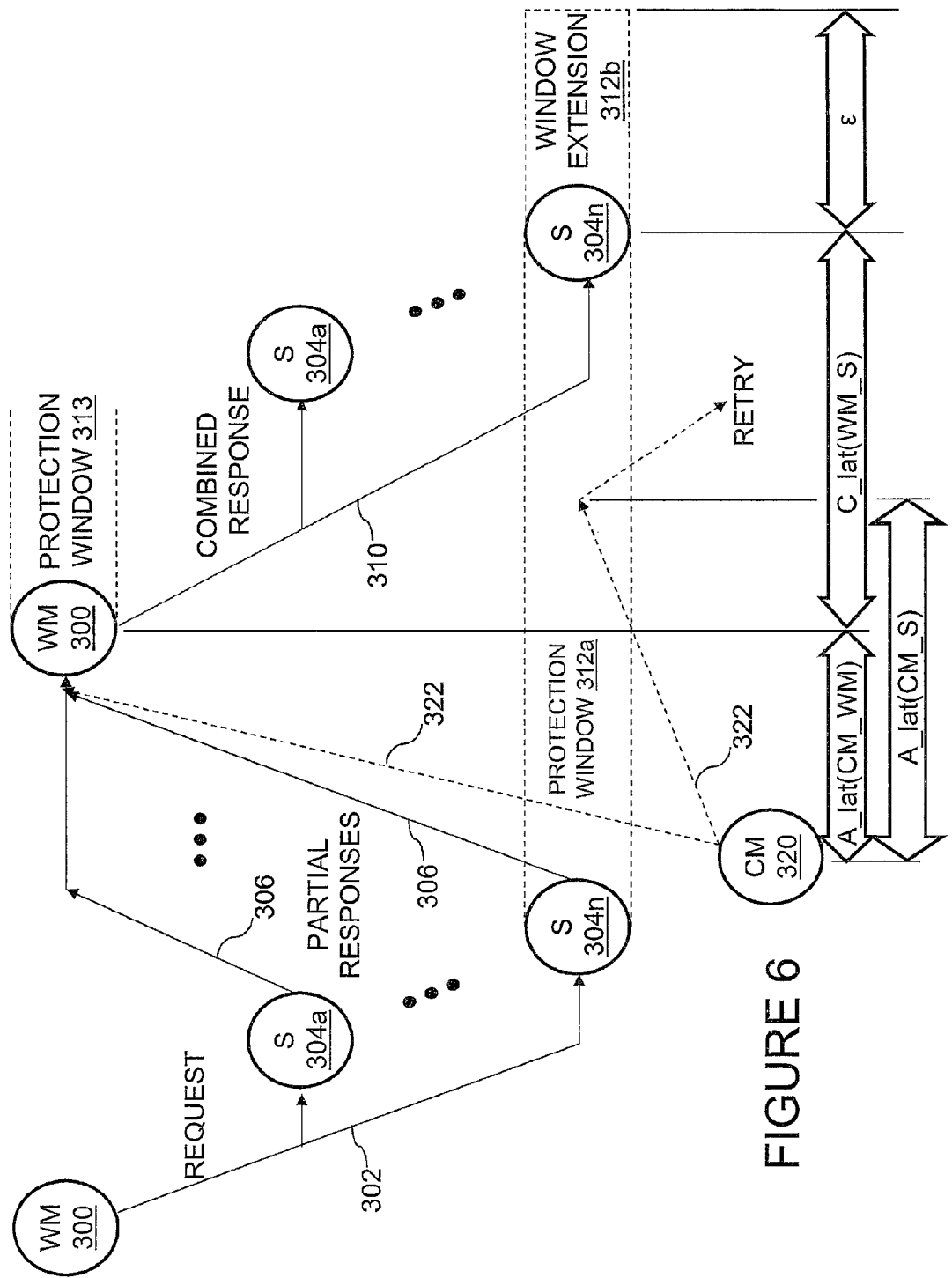
FIG. 6 is a time-space diagram of an exemplary operation, illustrating the timing constraints of an arbitrary data processing system topology.

As described above with reference to FIG. 3, coherency is maintained during the "handoff" of coherency ownership of a memory block from a snooper 304n to a requesting master 300 in the possible presence of other masters competing for ownership of the same memory block through protection window 312a, window extension 312b, and protection window 313. For example, as shown in FIG. 6, protection window 312a and window extension 312b must together be of sufficient duration to protect the transfer of coherency ownership of the requested memory block (also referred to as a data granule) from snooper 304n to winning master (WM) 300 in the presence of a competing request 322 by a competing master (CM) 320. To ensure that protection window 312a and window extension 312b have sufficient duration to protect the transfer of ownership of the requested memory block from snooper 304n to winning master 300, the latency of communication between processing units 100 in accordance with FIGS. 4A and 4B is preferably constrained such that the following conditions are met:

$$A\_lat(CM\_S) \leq A\_lat(CM\_WM) + C\_lat(WM\_S) + \epsilon,$$

or stated alternatively, $$\epsilon \geq A\_lat(CM\_S) - (A\_lat(CM\_WM) + C\_lat(WM\_S))$$

where A_lat(CM_S) is the address latency of any competing master (CM) 320 to the snooper (S) 304n owning coherence of the requested memory block, A_lat(CM_WM) is the address latency of any competing master (CM) 320 to the "winning" master (WM) 300 that is awarded coherency ownership by snooper 304n, C_lat(WM_S) is the combined response latency from the time that the combined response is received by the winning master (WM) 300 to the time the combined response is received by the snooper (S) 304n owning the requested memory block, and ε is the duration of window extension 312b.

If the foregoing timing constraint, which is applicable to a system of arbitrary topology, is not satisfied, the request 322 of the competing master 320 may be received (1) by winning master 300 prior to winning master 300 assuming coherency ownership and initiating protection window 312b and (2) by snooper 304n after protection window 312a and window extension 312b end. In such cases, neither winning master 300 nor snooper 304n will provide a partial response to competing request 322 that prevents competing master 320 from assuming coherency ownership of the memory block and reading non-coherent data from memory. However, to avoid this coherency error, window extension 312b can be programmably set (e.g., by appropriate setting of configuration register 123) to a length (ε) to compensate for latency variations or the shortcomings of a physical implementation that may otherwise fail to satisfy the timing constraint that must be satisfied to maintain coherency. Thus, by solving the above equation for ε, the ideal length of window extension 312b for each agent (e.g., processing unit 100) in any implementation can be determined.

As will be appreciated, the ideal length of window extension 312b will vary (be non-uniform) between agents based upon variations in the lengths of physical connections between agents (e.g., difference in the lengths of the A, B and X, Y and Z links) and the presence or absence of the various processing units 100 and/or processing nodes 202 in the topology. It is preferable to optimize the duration of the window extension 312b for each agent rather than applying a worst case (longest) duration to all agents to reduce the number of requests that are retried in the system to protect the handoff of coherency ownership.

Several observations may be made regarding the foregoing timing constraint. First, the address latency from the competing master 320 to the owning snooper 304a has no necessary lower bound, but must have an upper bound. The upper bound is designed for by determining the worst case latency attainable given, among other things, the maximum possible oscillator drift, the longest links coupling processing units 100, the maximum number of accumulated stalls, and guaranteed worst case throughput. In order to ensure the upper bound is observed, the interconnect fabric must ensure non-blocking behavior.

Second, the address latency from the competing master 320 to the winning master 300 has no necessary upper bound, but must have a lower bound. The lower bound is determined by the best case latency attainable, given, among other things, the absence of stalls, the shortest possible link between processing units 100 and the slowest oscillator drift given a particular static configuration.

Although for a given operation, each of the winning master 300 and competing master 320 has only one timing bound for its respective request, it will be appreciated that during the course of operation any processing unit 100 may be a winning master for some operations and a competing (and losing) master for other operations. Consequently, each processing unit 100 effectively has an upper bound and a lower bound for its address latency.

Third, the combined response latency from the time that the combined response is generated to the time the combined response is observed by the winning master 300 has no necessary lower bound (the combined response may arrive at the winning master 300 at an arbitrarily early time), but must have an upper bound. By contrast, the combined response latency from the time that a combined response is generated until the combined response is received by the snooper 304n has a lower bound, but no necessary upper bound (although one may be arbitrarily imposed to limit the number of operations concurrently in flight).

Fourth, there is no constraint on partial response latency. That is, because all of the terms of the timing constraint enumerated above pertain to request/address latency and combined response latency, the partial response latencies of snoopers 304 and competing master 320 to winning master 300 have no necessary upper or lower bounds.

V. First Embodiment for Configuring Protection Window Extension Durations

According to a first embodiment of the present invention, the duration of the window extension 312b for each agent is predetermined based upon which of a plurality of possible data processing system topologies is actually implemented. According to this first embodiment of the present invention and as shown in FIG. 7A, non-volatile data storage within data processing system 200 such as EEPROM 130 (also shown in FIG. 1) contains program code (e.g., epsilon configuration routine 700) and a data structure (e.g., epsilon table 702) containing multiple sets of possible window extension durations. The epsilon configuration routine 700 configures the epsilon register 140 in each agent (e.g., processing unit 100) by reference to one of the multiple sets of window extension durations specified in epsilon table 702 in accordance with the process depicted in FIG. 7B.

Figure 7B:
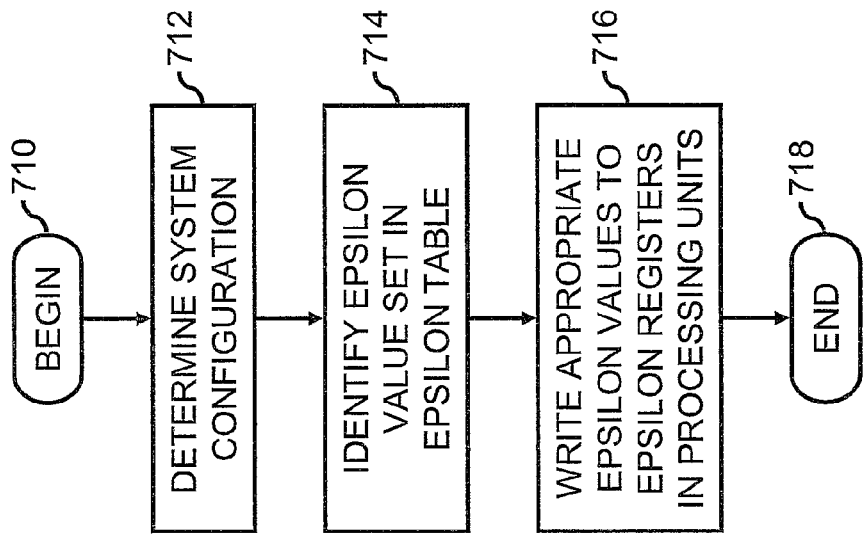
FIG. 7B is a high level logical flowchart of an exemplary method of setting the durations of non-uniform protection window extensions for agents in a data processing system in accordance with a first embodiment of the present invention.
Figure 7A:
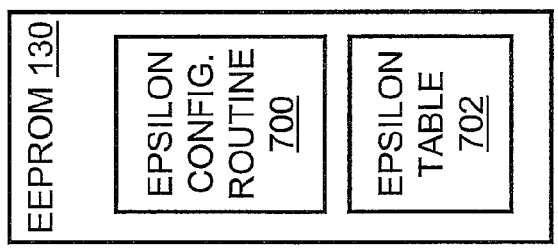
FIG. 7A is a high level block diagram of a non-volatile memory containing an epsilon configuration routine in accordance with a first embodiment of the present invention.

Referring now to FIG. 7B, there is depicted a high level logical flowchart of an exemplary process for setting the durations of non-uniform protection window extensions for agents in a data processing system 200 in accordance with a first embodiment of the present invention. The process begins at block 710, for example, in response to unillustrated boot software of data processing system 200 invoking execution of epsilon configuration routine 700 by a master processing unit 100 within data processing system 200 at system startup. Next, at block 712, epsilon configuration routine 700 determines the configuration of data processing system 200, for example, based upon which processing units 100 and processing nodes 202 are present and functional in data processing system 200, the physical lengths of the X, Y, Z and A and B links, and possibly other factors. In one implementation, the determination illustrated at block 712 can be made by reference to a predetermined memory location (e.g., in a processor register or system memory 132) loaded with a value representing the system configuration of data processing system 200.

Next at block 714, epsilon configuration routine 700 scans epsilon table 702 to locate the specific epsilon value set for the system configuration determined at block 712. As noted above, epsilon table 702 preferably includes a respective epsilon value set for each of the possible legal configurations of data processing system 200. The epsilon value sets recorded in epsilon table 702 can be determined, for example, by an a priori design analysis or during laboratory or simulation testing utilizing the methodology described below with respect to FIGS. 8A-8E. In response to locating the appropriate epsilon value set in epsilon table 702, epsilon configuration routine 700 writes the epsilon value (i.e., the duration of the window extension 312b) into the epsilon register 140 of each processing unit 100 (block 716). The write operations can be performed via a scan chain write operation or other well-known chip configuration mechanism. The illustrated process for configuring the durations of the window extensions 312b then terminates at block 718. Thereafter, all snoopers in each processing unit 100 utilize the window extension duration specified in the epsilon register 140 of that processing unit 100 to protect transfers of coherency ownership.

It will be appreciated that while the first embodiment of the present invention has been described with reference to an exemplary implementation in which en epsilon configuration routine within non-volatile data storage sets the epsilon duration for each agent by reference to a common data structure (i.e., epsilon table) within data storage, other implementations of the first embodiment are possible. For example, the functions of the epsilon configuration routine can alternatively be realized in hardware (e.g., in a PLA). Moreover, the data structure containing the durations of the agents' protection window extensions can be distributed in multiple locations within the data storage of the data processing system.

VI. Second Embodiment for Configuring Protection Window Extension Durations

Figures 8A, 8B:
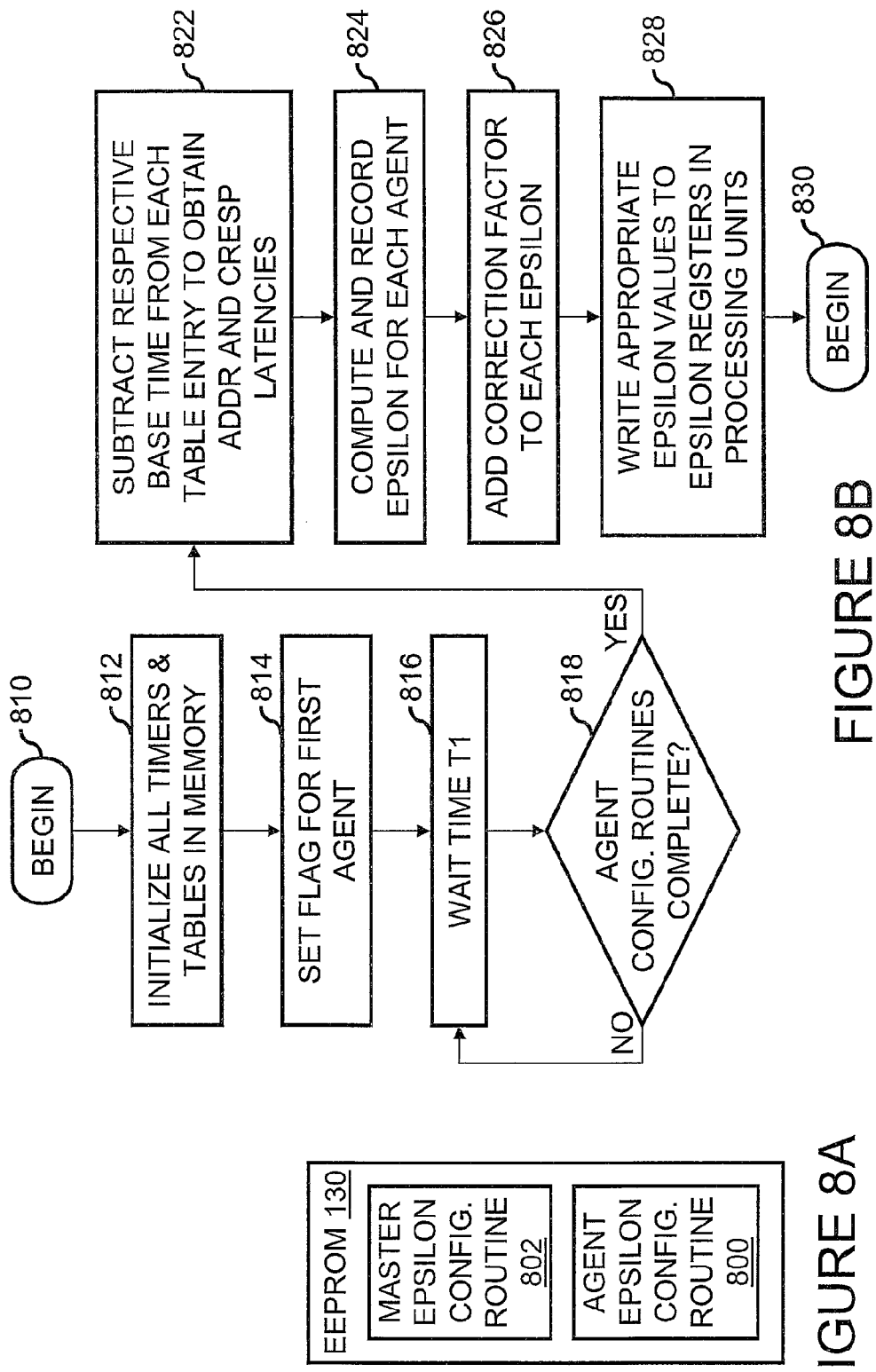
FIG. 8A is a high level block diagram of a non-volatile memory containing a master epsilon configuration routine and an agent epsilon configuration routine in accordance with a second embodiment of the present invention.
FIG. 8B is a high level logical flowchart of an exemplary method by which a master agent sets the durations of non-uniform protection window extensions for agents in a data processing system in accordance with the second embodiment of the present invention.

According to a second embodiment of the present invention, the duration of the window extension 312b for each agent is dynamically determined during system operation based upon the observed latencies in the data processing system 200. According to this second embodiment of the present invention and as shown in FIG. 8A, non-volatile memory within data processing system 200 such as EEPROM 130 (also shown in FIG. 1) contains an agent epsilon configuration routine 800 executed by each processing unit 100 in data processing system 200 and a master epsilon configuration routine 802 executed by only a single master processing unit 100 of data processing system 200. Master epsilon configuration routine 802 configures the epsilon register 140 in each agent (e.g., processing unit 100) by reference to actual operational latencies observed within data processing system 200 in accordance with the processes depicted in FIG. 8B, 8D and 8E.

Figure 8C:
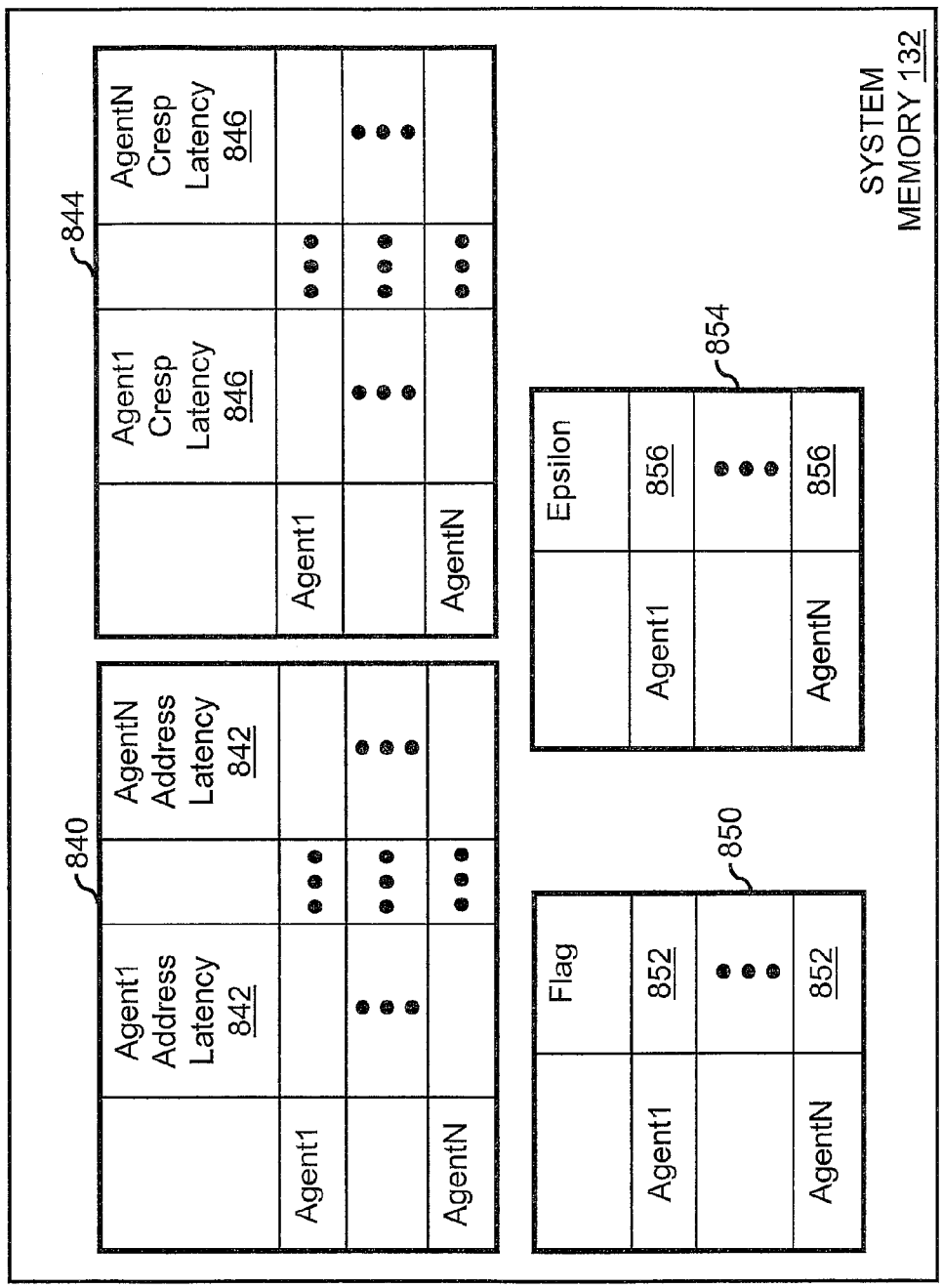
FIG. 8C is a block diagram of a system memory containing data strictures utilized to compute the appropriate durations of protection window extensions for the agents in a data processing system in accordance with the second embodiment of the present invention.

With reference now to FIG. 8B, there is illustrated a high level logical flowchart of an exemplary method by which a master processing unit 100 sets the durations of non-uniform protection window extensions for agents in a data processing system 200 in accordance with the second embodiment of the present invention. As illustrated, the process begins at block 810, for example, in response to unillustrated boot software of data processing system 200 invoking execution of agent epsilon configuration routine 800 by all processing units 100 within each data processing system 200 and execution of master epsilon configuration routine 802 by a single master processing unit 100 of data processing system 200 following system startup. Next, at block 812, master epsilon configuration routine 802 initializes and starts the timer 150 within each processing unit 100 so that all timers 150 monotonically increase (or decrease) at a predetermined rate to provide a common synchronized time standard for all processing units 100. In addition, master epsilon configuration routine 802 initializes in system memory 132 a number of data structures utilized to record the latencies observed at the various agents within data processing system 200. As depicted in FIG. 8C, in one exemplary embodiment, these data structures include an N×N address latency table 840 containing, for each of N agents present and functional in data processing system 200, a column 842 of address (i.e., request) latencies from that agent to each agent in data processing system 200. In addition, the data structures in system memory 132 include an N×N Cresp latency table 844 containing, for each of the N agents, a column 846 of Cresp latencies from that agent to each agent in data processing system 200. The data structures further include a first 1×N flag vector 850 containing, for each agent, a flag 852 for initiating a latency measurement operation by that agent as well as a 1×N epsilon vector 854 containing an epsilon field 856 for each agent.

All entries in address latency table 840 and Cresp latency table 844 are preferably initialized to a special value (e.g., the maximum value of all is) so that entries that have been written can be differentiated from those that have not been written. The entries in flag vector 850 are also preferably initialized to a reset state. All read and write accesses to tables 840, 844 and vectors 850 and 854 are preferably non-cacheable (i.e., cache inhibited) accesses. Performing these write operations as non-cacheable operations allows the write accesses to involve only the agent writing to system memory 132 and the associated IMC 124 and to not involve L2 caches 110, which are not yet configured with the epsilon values to maintain memory coherence.

With reference again to FIG. 8B, to begin latency measurement, master epsilon configuration routine 802 sets the flag 852 of Agent1 (which is preferably the master processing unit 100 itself) in flag vector 850 to cause the agent epsilon configuration routine 800 of master processing unit 100 to broadcast a latency measurement operation on the interconnect fabric to all processing units 100 (block 814). Master epsilon configuration routine 802 then waits for a time T1, as shown at block 816, in order for the agent epsilon configuration routine 800 of each processing unit 100 present in the system to perform the process depicted in FIG. 8D. After time T1 has elapsed, master epsilon configuration routine 802 then tests whether all agent epsilon configuration routines 800 have completed their processing by determining whether all entries in tables 840 and 844 have been filled by the agent epsilon configuration routines 800 (block 818). If not, master epsilon configuration routine 802 again waits at block 816 and repeats the test depicted at block 818. Blocks 818 and 816 are thus performed iteratively until the test depicted at block 818 has a positive result, indicating that all agent epsilon configuration routines 800 have completed execution. Thereafter, the process passes to blocks 822-826, which depict master epsilon configuration routine 802 processing the raw data recorded within address latency table 840 and Cresp latency table 844.

Figure 8D:
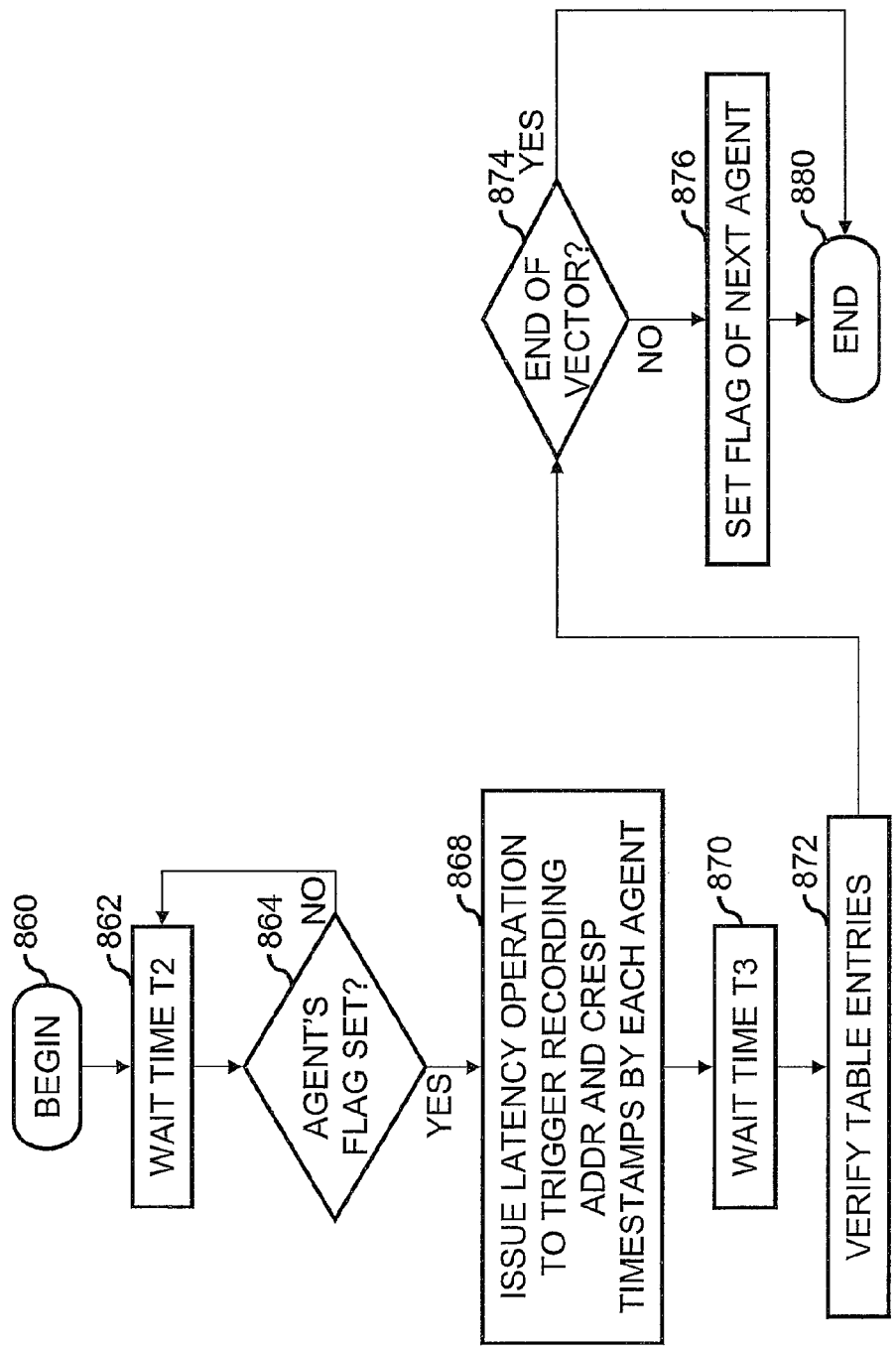
FIG. 8D is a high level logical flowchart of an exemplary method by which each agent in a data processing system invokes the collection of timestamp values indicative of address and combined response latencies to other agents in the data processing system in accordance with the second embodiment of the present invention.

Block 822 illustrates master epsilon configuration routine 802 subtracting the base timestamp recorded along the diagonal of each of tables 840 and 844 from all table entries in the same column 842 or 846 to normalize the raw timestamp data. For example, the address latency timestamp of Agent1-to-Agent1 is subtracted from all address latency entries for the Agent1 address latency column 842 in address latency table 840, and the address latency timestamp of AgentN-to-AgentN is subtracted from all address latency entries for the AgentN address latency column 842 of address latency table 840. Similarly, the Cresp latency timestamp of Agent1-to-Agent1 is subtracted from all Cresp latency entries for the Agent1 Cresp latency column 846 in Cresp latency table 844, and the Cresp latency timestamp of AgentN-to-AgentN is subtracted from all Cresp latency entries for the AgentN Cresp latency column 846 of Cresp latency table 844. By this process, the timestamps recorded within tables 840 and 844 in accordance with the process shown in FIG. 8D are converted to address and Cresp latencies, respectively. Next, at block 824, master epsilon configuration routine 802 computes the following equation to determine the maximum epsilon for each agent given the address and Cresp latencies for all possible combinations of competing masters (CMs) and winning masters (WM) recorded in tables 840 and 844 according to the equation:

$$\epsilon \geq A\_lat(CM\_S) - (A\_lat(CM\_WM) + C\_lat(WM\_S))$$

Master epsilon configuration routine 802 records the maximum epsilon for each agent (e.g., processing unit 100) in epsilon vector 854. As depicted at block 826, master epsilon configuration routine 802 then adds a small correction factor to each epsilon value recorded in epsilon vector 854 to account for timing jitter, for example, due to variations in the communication latencies of requests via the internal signal paths in a processing unit 100 and other timing factors that cause timing variability between operations.

Following block 826, the process passes to block 828, which depicts master epsilon configuration routine 802 writing the appropriate epsilon value (i.e., the duration of the window extension 312*b*) from epsilon vector 854 into the epsilon register 140 of each processing unit 100. The write operations depicted at block 828 can be performed via a scan chain write operation or other well-known chip configuration mechanism. Thereafter, the illustrated process for configuring the durations of the window extensions 312*b* then terminates at block 830. Thereafter, all snoopers in each processing unit 100 utilize the duration of the window extension 312*b* specified in the epsilon register 140 of that processing unit 100 to protect transfers of coherency ownership.

Referring now to FIG. 8D, there is depicted a high level logical flowchart of an exemplary method by which each agent (e.g., processing unit 100) in a data processing system invokes the collection of timestamp values indicative of address and combined response latencies to other agents in the data processing system in accordance with the second embodiment of the present invention. The process begins at block 860 in response to the invocation of agent epsilon configuration routine 800 by unillustrated boot software within data processing system 200 following system startup. As illustrated at block 862, agent epsilon configuration routine 800 then waits a time T2 prior to testing at block 864 whether its agent's associated flag 852 within flag vector 850 is set to indicate that it is that agent's turn to invoke the collection of latency data by issuing a latency measurement operation. It is desirable for the agents to issue such operations serially to prevent flooding the system with concurrent operations, potentially increasing operation latencies and unnecessarily increasing the duration of protection window extensions 312*b*. In response to a determination at block 864 that the agent's flag 852 is not set, the process returns to block 862, and blocks 864 and 862 are repeated iteratively until a positive determination is made at block 864.

In response to a determination at block 864 that the agent's flag 852 is set in flag vector 850, the process passes to block 868. At block 868, agent epsilon configuration routine 800 broadcasts a special latency measurement request to all agents within data processing system 200 to trigger recording within the relevant entries of address latency table 840 and Cresp latency table 844 timestamps indicative of the address and Cresp latencies of each agent. The latency measurement request is preferably identified as such by a special transaction type (ttype) contained in the request. After issuing the latency measurement request, agent epsilon configuration routine 800 waits for a time T3, as shown at block 870, in order to permit all snooping agents to write their timestamps to tables 840 and 844. Agent epsilon configuration routine 800 thereafter verifies at block 872 that all entries within its agent's column in address latency table 840 and Cresp latency table 844 are filled by a latency timestamp and not by the special value to which they were initialized.

Following block 872, agent epsilon configuration routine 800 determines at block 874 whether its agent is AgentN (i.e., the last agent). If so, the process depicted in FIG. 8D terminates at block 880. If, on the other hand, agent epsilon configuration routine 800 determines at block 878 that its agent is not AgentN, agent epsilon configuration routine 800 sets the flag 852 of the next agent in sequence, as illustrated at block 876, in order to invoke the next agent's performance of the steps illustrated at block 864 and following blocks. Thereafter, the process terminates at block 880.

Figure 8E:
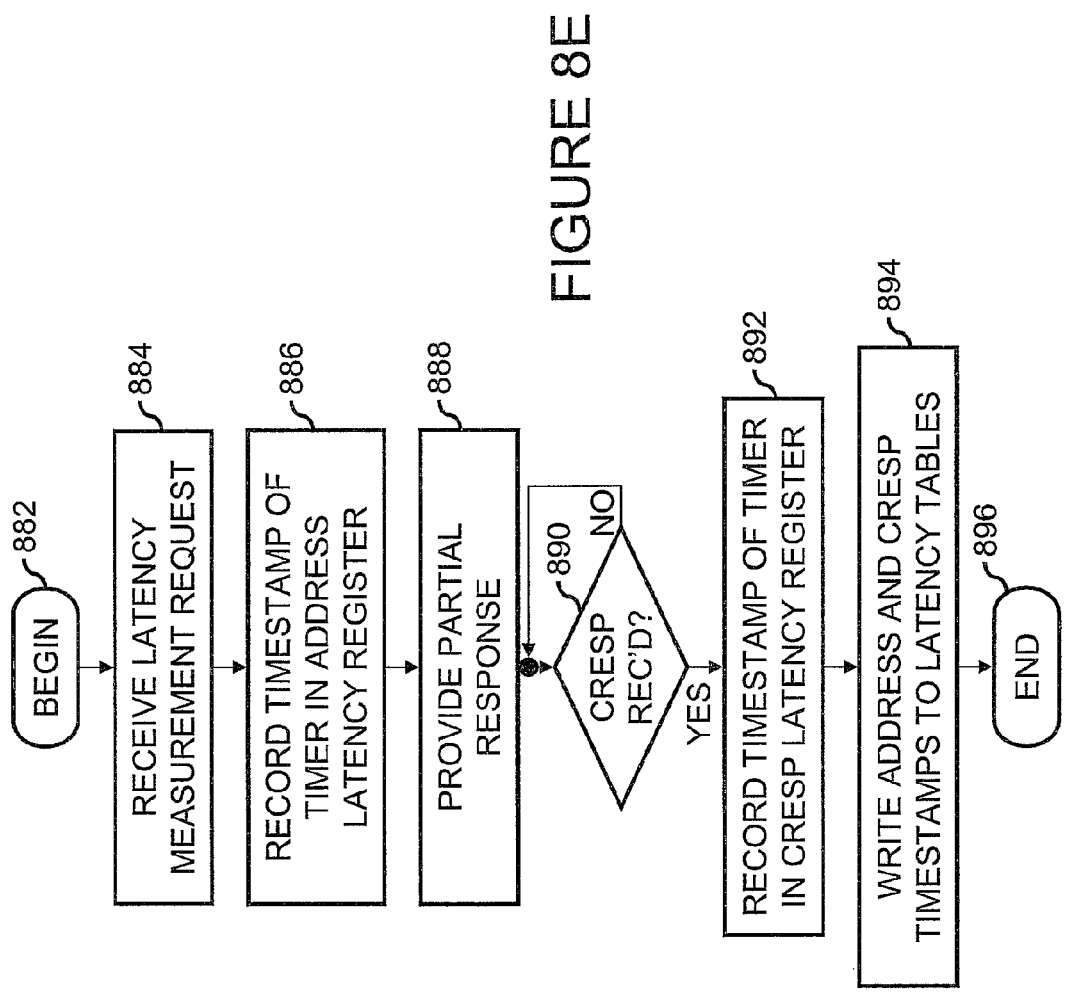
FIG. 8E is a high level logical flowchart of an exemplary method by which a designated snooper within each agent in a data processing system records address and combined response timestamps for a latency measurement operation in accordance with the second embodiment of the present invention.

With reference now to FIG. 8E, there is illustrated a high level logical flowchart of an exemplary method by which a designated snooper within each agent in a data processing system records address and combined response timestamps for a latency measurement operation in accordance with the second embodiment of the present invention. The illustrated process begins at block 882 and then proceeds to block 884, which depicts a designated snooper in the agent (e.g., a designated one of snoopers 116) receiving a globally broadcast latency measurement request issued by an agent in data processing system 200. As shown at block 886, in response to receipt of the latency measurement request, the designated snooper records the timestamp of its timer 150 when it received the latency measurement request within its local address timestamp register 152. The designated snooper then provides a partial response (e.g., Null), as depicted at block 888, and awaits receipt of the combined response (Cresp) for the latency measurement operation, as depicted at block 890. In response to receipt of the Cresp of the latency measurement operation, the designated snooper also records within Cresp timestamp register 154 the timestamp of its timer 150 (block 892). The designated snooper then initiates cache-inhibited write operations to write the timestamp from its address timestamp register 152 to the appropriate entry in address latency table 840 and to write the timestamp from its Cresp timestamp register 154 to the appropriate entry in address latency table 844. Thereafter, the process depicted in FIG. 8E terminates at block 896.

It will be appreciated that while the second embodiment of the present invention has been described with reference to an exemplary implementation in which master and agent epsilon configuration routines within non-volatile data storage are utilized to configure the epsilon duration for each agent by reference to observed latencies, other implementations of the second embodiment are possible. For example, the functions of the master and agent epsilon configuration routines can alternatively be realized in hardware.

VII. Conclusion

As has been described, the present invention provides improved data processing systems, program products, and methods of data processing in which the durations of protection window extensions employed by snoopers to protect transfers of coherency ownership are non-uniform. According to one embodiment, the durations of the protection window extension are predetermined and written to individual agents in the data processing system. In another embodiment, the durations of the protection window extensions are dynamically determined based upon actual latencies observed in the data processing system.

While the invention has been particularly shown as described with reference to a preferred embodiment, it will be understood by those skilled in the art that various changes in form and detail may be made therein without departing from the spirit and scope of the invention. For example, although the agent for which all snoopers share a common window extension duration is a processing unit 100 in the depicted embodiment, those skilled in the art will appreciate that in other embodiments a greater or lesser number of snoopers can share a common window extension duration. In addition, although aspects of the present invention have been described with respect to a data processing system executing program code that directs the functions of the present invention, it should be understood that present invention may alternatively be implemented as a program product for use with a data processing system. Program code defining the functions of the present invention can be delivered to a data processing system via a variety of computer readable media, which include, without limitation, non-rewritable storage media (e.g., CD-ROM), rewritable storage media (e.g., a floppy diskette or hard disk drive), and communication media, such as digital and analog networks. It should be understood, therefore, that such computer readable media, when carrying or encoding computer readable instructions that direct the functions of the present invention, represent alternative embodiments of the present invention.

What is claimed is:
1. A data processing system, comprising:
a plurality of agents coupled for communication of operations, each of said plurality of agents including a processor core for processing data and instructions, each operation including a request and a combined response representing a system-wide response to the request; and
data storage coupled to one or more of the plurality of agents, the data storage including program code executable by a processor core to cause the data processing system to observe latencies of requests and combined responses between said plurality of agents and to configure each of said plurality of agents with a respective duration of a protection window extension in accordance with said observed latencies by setting a storage location in each of said plurality of agents with a value indicative of a protection window extension duration of that agent, wherein each protection window extension is a period following receipt of a combined response during which an associated one of the plurality of agents protects transfer of coherency ownership of a data granule between agents, and wherein at least two of said agents have protection window extensions of differing durations.

2. The data processing system of claim 1, wherein:
an agent among said plurality of agents includes multiple snoopers;

all of said multiple snoopers employ the protection window extension duration of the agent.

3. The data processing system of claim 1, wherein each protection window extension has a duration of at least a first communication latency of a request between a competing master in one of said plurality of agents and a protecting snooper in one of said plurality of agents less a second communication latency of a request between said competing master and a winning master that initiated the request less a third communication latency of the combined response between the winning master and the protecting snooper.

4. The data processing system of claim 1, wherein said program code comprises:
master epsilon configuration program code executed by a master agent among the plurality of agents; and
agent epsilon configuration program code executed by each of said plurality of agents.

5. The data processing system of claim 1, wherein said program code causes each of said plurality of agents to issue an operation that causes each other of said plurality of agents to record values indicative of its observed request and combined response latencies.

6. A method of data processing in a data processing system, said method comprising:
communicating operations between a plurality of agents in the data processing system, each operation including a request and a combined response representing a system-wide response to the request; and
observing latencies of requests and combined responses between said plurality of agents;
configuring each of said plurality of agents with a respective duration of a protection window extension in accordance with said observed latencies by setting a storage location in each of said plurality of agents with a value indicative of a protection window extension duration that agent, wherein each protection window extension is a period following receipt of a combined response during which an associated one of the plurality of agents protects transfer of coherency ownership of a data granule between agents, and wherein at least two of said agents have protection window extensions of differing durations; and
said plurality of agents employing protection window extensions in accordance with the configuring step.

7. The method of claim 6, wherein:
an agent among said plurality of agents includes multiple snoopers;
said employing step comprises all of said multiple snoopers in the agent employing the protection window extension duration of the agent.

8. The method of claim 6, wherein each protection window extension has a duration of at least a first communication latency of a request between a competing master in one of said plurality of agents and a protecting snooper in one of said plurality of agents less a second communication latency of a request between said competing master and a winning master that initiated the request less a third communication latency of the combined response between the winning master and the protecting snooper.

9. The method of claim 6, wherein:
said configuring step further comprises invoking each of said plurality of agents to issue an operation that causes each other of said plurality of agents to record values indicative of its observed request and combined response latencies.

10. A program product for configuring a data processing system including a plurality of agents, said program product comprising:
a tangible computer-readable storage medium; and
program code within the computer-readable storage medium and executable by a data processing system to cause the data processing system to:
communicate operations between a plurality of agents in the data processing system, each operation including a request and a combined response representing a system-wide response to the request;
observe latencies of requests and combined responses between said plurality of agents; and
configure each of said plurality of agents with a respective duration of a protection window extension by in accordance with said observed latencies by setting a storage location in each of said plurality of agents with a value indicative of a protection window extension duration that agent, wherein each protection window extension is a period following receipt of a combined response during which an associated one of the plurality of agents protects transfer of coherency ownership of a data granule between agents, and wherein at least two of said agents have protection window extensions of differing durations.

11. The program product of claim 10, wherein:
an agent among said plurality of agents includes multiple snoopers;
the program code causes the data processing system to configure all of multiple snoopers in an agent among the plurality of agents with the protection window extension duration of the agent.

12. The program product of claim 10, wherein each protection window extension has a duration of at least a first communication latency of a request between a competing master in one of said plurality of agents and a protecting snooper in one of said plurality of agents less a second communication latency of a request between said competing master and a winning master that initiated the request less a third communication latency of the combined response between the winning master and the protecting snooper.

13. The program product of claim 10, wherein:
said program code causes the data processing system to configure each of the plurality of agents by invoking each of said plurality of agents to issue an operation that causes each other of said plurality of agents to record values indicative of its observed request and combined response latencies.

* * * * *